(12) United States Patent
Hashimoto et al.

(10) Patent No.: US 7,601,460 B2
(45) Date of Patent: Oct. 13, 2009

(54) PRISMATIC BATTERY AND MANUFACTURING METHOD THEREOF

(75) Inventors: Tatsuya Hashimoto, Wakayama (JP); Masatomo Nagatani, Wakayama (JP); Hiroaki Ichinose, Osaka (JP)

(73) Assignee: Panasonic Corporation, Osaka (JP)

( * ) Notice: Subject to any disclaimer, the term of this patent is extended or adjusted under 35 U.S.C. 154(b) by 864 days.

(21) Appl. No.: 10/996,450

(22) Filed: Nov. 26, 2004

(65) Prior Publication Data

US 2005/0118501 A1    Jun. 2, 2005

(30) Foreign Application Priority Data

| Nov. 28, 2003 | (JP) | ............................. | 2003-398482 |
| Nov. 28, 2003 | (JP) | ............................. | 2003-398841 |
| Dec. 5, 2003 | (JP) | ............................. | 2003-406878 |
| Jun. 11, 2004 | (JP) | ............................. | 2004-173422 |
| Jun. 25, 2004 | (JP) | ............................. | 2004-187463 |

(51) Int. Cl.
*H01M 2/08* (2006.01)
*H01M 2/28* (2006.01)
*H01M 2/04* (2006.01)
*H01M 4/82* (2006.01)

(52) U.S. Cl. ........................ 429/180; 429/181; 429/185; 429/161; 429/176; 29/623.4

(58) Field of Classification Search .......... 429/178–181
See application file for complete search history.

(56) References Cited

U.S. PATENT DOCUMENTS

| 2,972,655 | A | * | 2/1961 | Strauss ........................ 429/175 |
| 4,020,241 | A | * | 4/1977 | Heinz, Jr. ...................... 429/54 |
| 4,276,360 | A | * | 6/1981 | Hardigg et al. ............. 429/175 |
| 4,288,504 | A | * | 9/1981 | Julian et al. ................. 429/179 |
| 4,672,010 | A | * | 6/1987 | Tucholski et al. ............. 429/56 |
| 4,879,191 | A | * | 11/1989 | Sindorf ........................ 429/181 |
| 5,834,133 | A | * | 11/1998 | Narukawa et al. ........... 429/171 |

(Continued)

FOREIGN PATENT DOCUMENTS

CN            1307369         8/2001

(Continued)

OTHER PUBLICATIONS

Online translation of JP 06-045253, Onishi et al. Jun. 14, 1994.*

(Continued)

*Primary Examiner*—Dah-Wei D Yuan
*Assistant Examiner*—Kwang Han
(74) *Attorney, Agent, or Firm*—Greenblum & Bernstein, P.L.C.

(57) ABSTRACT

A prismatic battery with highly reliable sealing properties and its manufacturing method, wherein a negative collector is welded to one end of an electrode plate group accommodated in a prismatic case, the collector being connected to an electrode pole that functions as the negative electrode terminal, and the electrode pole is fitted into a support cylinder that is provided on an upper lid for closing one open end of the case. An insulating gasket is interposed between an inner periphery of the support cylinder and an outer periphery of the electrode pole, the support cylinder being formed with at least one annular crimped portion that has an arc-shaped longitudinal cross section.

18 Claims, 10 Drawing Sheets

U.S. PATENT DOCUMENTS

| | | | |
|---|---|---|---|
| 6,027,831 A * | 2/2000 | Inoue et al. | 429/181 |
| 6,132,900 A * | 10/2000 | Yoshizawa et al. | 429/185 |
| 6,544,684 B2 | 4/2003 | Onishi et al. | |
| 6,555,264 B1 | 4/2003 | Hamada et al. | |
| 6,692,863 B1 * | 2/2004 | Nakanishi et al. | 429/94 |
| 6,821,673 B1 | 11/2004 | Hamada et al. | |
| 6,833,010 B2 | 12/2004 | Asahina et al. | |
| 7,358,008 B2 * | 4/2008 | Nanno et al. | 429/209 |
| 2002/0122978 A1 * | 9/2002 | Setliff | 429/178 |
| 2003/0157404 A1 * | 8/2003 | Inoue et al. | 429/175 |
| 2004/0191612 A1 * | 9/2004 | Akita et al. | 429/94 |

FOREIGN PATENT DOCUMENTS

| | | |
|---|---|---|
| JP | 60-056376 | 4/1985 |
| JP | 5-109393 | 4/1993 |
| JP | 6-045253 | 6/1994 |
| JP | 7-272701 | 10/1995 |
| JP | 8-315790 | 11/1996 |
| JP | 9-045296 | 2/1997 |
| JP | 09-237613 | 9/1997 |
| JP | 2003-208876 | 7/2003 |

OTHER PUBLICATIONS

English language Abstract of CN 1307369, Aug. 8, 2001.

* cited by examiner

PRISMATIC BATTERY AND MANUFACTURING METHOD THEREOF

The present disclosure relates to subject matter contained in priority Japanese Patent Application Nos. 2003-398482, 2003-398841, 2003-406878, 2004-173422 and 2004-187463, filed on Nov. 28, 2003, Nov. 28, 2003, Dec. 5, 2003, Jun. 11, 2004 and Jun. 25, 2004, respectively, the contents of which is herein expressly incorporated by reference in its entirety.

BACKGROUND OF THE INVENTION

1. Field of the Invention

The present invention relates to a prismatic battery that has a rectangular, round rectangular, or oval cross section and to its manufacturing method, and more particularly to an electrode terminal structure of the battery.

2. Description of the Related Art

Japanese Utility Model Laid-Open Publication No. 6-45253 shows a sealing structure of a battery that has an electrode pole as one terminal, and a battery case serving as the other terminal. The electrode pole is fixedly attached at its base end to a current collector that is welded to an electrode plate group, and fitted in a support cylinder formed in the lid of the case, with a sealing gasket inserted therebetween. The support cylinder is crimped to form an annular dent that has a square longitudinal cross section, so as to compress the gasket between the pole and cylinder for providing a seal.

Japanese Patent Laid-Open Publication No. 8-315790 shows a laser welding method for a prismatic battery wherein a lid is placed on the open end edge of a case and welded for sealing. As shown in FIG. 14, the outer periphery of the lid 52 is abutted to the inner periphery of the open end of the case 51, and the abutment surface is fused together to form a weld 53. The lid is first provisionally welded at three or more locations of the entire circumference before it is permanently welded to the case over the entire periphery.

Japanese Patent Laid-Open Publication No. 7-272701 shows a laser welding method for preventing battery packing defects resulting from packing damage caused by laser reflection light during the welding process. The outer surface of the lid, on which the packing is placed, is positioned higher than the open end of the case when projecting laser light, so that the fused part has a spherical surface downwards from the lid to the case. Thereby, the laser reflection light is directed opposite the packing.

Japanese Patent Laid-Open Publication No. 9-45296 shows a laser welding method for batteries wherein, as shown in FIG. 15, a lid 55 having a skirt 56 upwardly protruding from the outer periphery is fitted to the inner periphery of the open end of a cylindrical case 54, and the abutting edges of the open end of the case 54 and the skirt 56 are fused together to form a weld 57.

Battery case, whether it is cylindrical or prismatic, generally consists of a bottomed case accommodating an electrode plate group and a lid welded to the open end of the case, with or without a gasket interposed therebetween.

In such a manufacturing method of bottomed prismatic battery case, when a steel plate is used to manufacture the battery case, Japanese Patent Laid-Open Publication No. Hei 5-109393 shows a method for deep-drawing and pressing a nickel-plated steel plate with the nickel-plated side inside.

Japanese Patent Laid-Open Publication No. 9-237613 shows a prismatic case manufacturing method wherein a shallow bottomed cylindrical case that has been formed by pressing is drawn through several stages into a deep bottomed prismatic case.

Japanese Patent Laid-Open Publication No. 2003-208876 shows a method for forming a deep bottomed prismatic case by drawing and ironing processes, wherein a pellet is reformed into an intermediate cup having an oval cross section by impact forming, and the intermediate cup is then drawn and ironed continuously at one time.

Japanese Patent Laid-Open Publication No. 60-56376 shows a manufacturing method of a non-cylindrical battery wherein an electrode plate group wound around into a cylindrical shape is accommodated in a cylindrical outer case, and the case is pressed into a predetermined shape such as a prismatic shape, and closed with conforming lids at its both open ends.

With the technique shown in Japanese Utility-Model Laid-Open Publication No. 6-45253, the electrode pole is formed with a relatively deep annular dent having a square longitudinal cross section to a deepness approximately equal to the thickness of the sealing gasket. The support cylinder is plastically deformed (crimped) from outside so as to bend and press the gasket into the dent with a square longitudinal cross section, to provide a seal between the electrode pole and the support cylinder. With this method, there was the risk that cracks were generated in the gasket when crimping the support cylinder, leading to unreliable sealing properties. Also, the bent portion of the gasket was liable to break due to an impact external force.

Another problem was that, since the electrode pole, which was rigidly attached to the current collector, was fitted into the support cylinder formed on the lid, it was hard to achieve concentricity between the electrode pole and the support cylinder because of dimensional tolerances of the current collector and the electrode pole and dimensional errors of the case and lid. When the electrode pole and the support cylinder are not concentric with each other, the pressure is applied unevenly to the gasket when crimping the cylinder, whereby an adequate seal can not be formed because of insufficient compression of the gasket or because of breakage of the gasket caused by excessive compression.

The problem with the laser welding processes for prismatic battery cases shown in Japanese Patent Laid-Open Publications No. 8-315790 or No. 7-272701 was that, while the thick flat lid 52 was suitable for forming a strong weld 53 without impairing the flatness of the case 51 end face or the lid 52, its weight took up much of the battery weight because of its large thickness that was for withstanding pressure buildup to a predetermined level.

The lid 55 used in the laser welding method for sealing a battery shown in Japanese Patent Laid-Open Publication No. 9-45296 is thinner and more lightweight because of its structure wherein the skirt 56 is formed at the outer periphery. However, since, as shown in FIG. 16A, laser light 58 is projected vertically to the abutting edges of the case 54 end and the skirt 56 end, the abutting edges tend to fuse together entirely as shown in FIG. 16B, forming an uneven weld 59. This not only impairs the flatness of the case end face, but also may cause electrolyte leakage because of weld failure.

The problem could be solved by reducing the diameter of the laser beam 58 when projecting the beam to the abutting edge as shown in FIG. 16C, but in order to achieve required weld strength with such a small-diameter laser beam, it would be necessary to form a deep weld 60, which would take much time and reduce the productivity.

Prismatic batteries are often required to be flat and high so as to achieve large capacity and high cooling efficiency. With the deep drawing techniques shown in Japanese Patent Laid-Open Publications Nos. 5-109393, 9-237613, and 2003-208876, it was hard to produce bottomed cases with a large height while maintaining necessary productivity. The technique shown in Japanese Patent Laid-Open Publication No. 60-56376 could not be applied to produce flat prismatic batteries.

Another problem with deep drawing methods was that it did not allow much freedom of design for battery capacities because it was difficult to produce bottomed cases of various heights in view of negative cost factors such as required production equipment and change-over time.

SUMMARY OF THE INVENTION

In view of the foregoing, it is an object of the present invention to overcome the problems associated with the conventional techniques, and to provide a prismatic battery that has a highly reliable sealing structure for the part where an electrode pole or terminal passes through the battery case lid. Another object of the invention is to provide a prismatic battery that uses a lightweight lid laser-welded to the case with satisfactory end face flatness, while offering sufficient weld strength, good sealing properties, and high productivity. Yet another object of the invention is to provide a flat, high, and prismatic battery that is manufactured with good productivity irrespective of its capacity. A further object of the invention is to provide a suitable manufacturing method of the above prismatic battery.

A prismatic battery according to one aspect of the present invention comprises: a prismatic case having an open end for accommodating an electrode plate group; a current collector of one polarity welded to one end of the electrode plate group; an electrode pole that functions as an electrode terminal connected to the current collector; a lid for closing the open end of the case, the lid being formed with a support cylinder that is fitted onto the electrode pole; and an insulating gasket interposed between an inner periphery of the support cylinder and an outer periphery of the electrode pole, wherein the support cylinder is formed with at least one annular crimped portion that has an arc-shaped longitudinal cross section.

By forming the annular crimped portion in the support cylinder, the insulating gasket between the electrode pole and the support cylinder is compressed, thereby providing a good seal. Because the crimped portion has an arc-shaped longitudinal cross section, there is no risk of generating a crack in the gasket due to locally concentrated excessive load, so that it is ensured that a good seal is provided.

The current collector of one polarity, which is welded to one end of the electrode plate group, and the electrode pole, which is provided on the lid of the case, are connected via a buffer, so that the buffer smoothly absorbs positional errors of the pole relative to the current collector or dimensional tolerances of the case and the lid. Therefore, there is no risk that the insulating gasket between the electrode pole and the lid or between the lid and the case is unevenly compressed, and sealing is achieved highly reliably. Even if an external impact is applied to the electrode pole, the pole freely sways around the sealed part to absorb any displacement from the center position, so that the sealing property is not significantly affected and stably maintained.

Preferably, the lid has a shape that conforms to an inner periphery of the open end of the case, and includes a skirt protruding outwards from the outer peripheral edge of the lid, the lid being hermetically welded to the open end of the case by projecting laser beam from an inner side of the skirt of the lid toward the edge of the skirt to form a weld joint between the open end edge of the case and the edge of the skirt.

Because of the structure of the lid with the skirt standing from the outer periphery, the lightweight thin-plate lid offers good surface strength and rigidity, and enables weight reduction of the battery. The sealing structure of the invention, wherein the open end edge of the case and the edge of the skirt are fused together, withstands higher pressure in the event of pressure buildup inside the case followed by swelling of the case, as the weld joint functions as a fulcrum and mitigates the force applied to the joint. Furthermore, since laser beam is projected from the inner side of the skirt toward the edge of the skirt, it is possible, without having to use a small-diameter laser beam, to fuse together the edge of the skirt and the open end edge of the case such that the edge surface of the case is not entirely fused. Thus the weld joint, which exhibits high strength and good sealing properties, is formed efficiently, while maintaining satisfactory case end face flatness.

Further, it is preferable that the battery case comprises a square tube case made from a cylindrical tube having open ends, and lids for closing both the open ends.

According to this configuration, flat square tube cases are made from cylindrical tubes with good productivity irrespective of the length. Since the battery case is made simply by sealing the open ends of the case with lids, it is produced with much increased productivity as compared to deep-drawn prismatic cases. Thus, flat prismatic batteries of various lengths or capacities having high cooling properties are produced at low cost with good productivity. The battery case will have any length, since the length of the case is readily changed, and so various different capacity batteries will be produced at low cost with good productivity by only changing the length of the electrode plate group, other elements all being used in common.

A method for manufacturing a prismatic battery according to another aspect of the present invention, comprises the steps of: preparing an electrode plate group; welding a current collector to at least one end of the electrode plate group; hermetically welding a first lid to one open end of a prismatic case having open ends, the first lid including an electrode terminal provided with an insulating member; inserting the electrode plate group into the case from the other open end thereof; and hermetically welding a second lid to the other open end of the case, the second lid being connected to the other end of the electrode plate group.

With this method, prismatic batteries that have an electrode terminal of one polarity opposite from that of the case will be manufactured with good productivity, using prismatic cases with open ends. Assembling of the electrode terminal to the lid and establishing electrical connection between the terminal and the current collector at one end of the electrode plate group are performed at any appropriate step in the method. Likewise, electrical connection between the other end of the electrode plate group and the lid is performed at any appropriate step.

The method may further comprise the steps of: forming a support cylinder in the first lid for closing the one open end of the case; welding an electrode pole that functions as one electrode terminal to the current collector welded to one end of the electrode plate group, wherein the electrode pole is fitted in the support cylinder; mounting an insulating gasket to the electrode pole prior to the step of inserting the electrode plate group into the case; and compressing the insulating gasket by crimping the support cylinder to provide a seal between the electrode pole and the support cylinder after the step of inserting the electrode plate group into the case. This way, the prismatic battery that has an electrode pole in the lid at one end of the case functioning as one electrode terminal of the opposite polarity from that of the case is manufactured with good productivity.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF THE PREFERRED EMBODIMENTS

Preferred embodiment of the present invention will now be described below with reference to the accompanying drawings. It should be noted that the embodiments described below do not intend to limit the scope of the present invention, but exemplify the invention.

One of preferred embodiments of the prismatic battery of the invention will be described hereinafter with reference to FIG. 1A to FIG. 13.

Figure 1A:
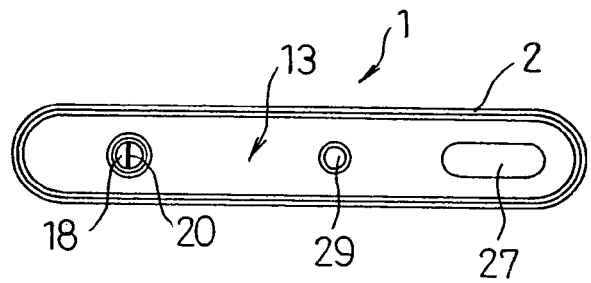
FIG. 1A is a plan view and FIG. 1B is a longitudinal cross-sectional front view of one embodiment of a prismatic battery of the invention.
Figure 1B:
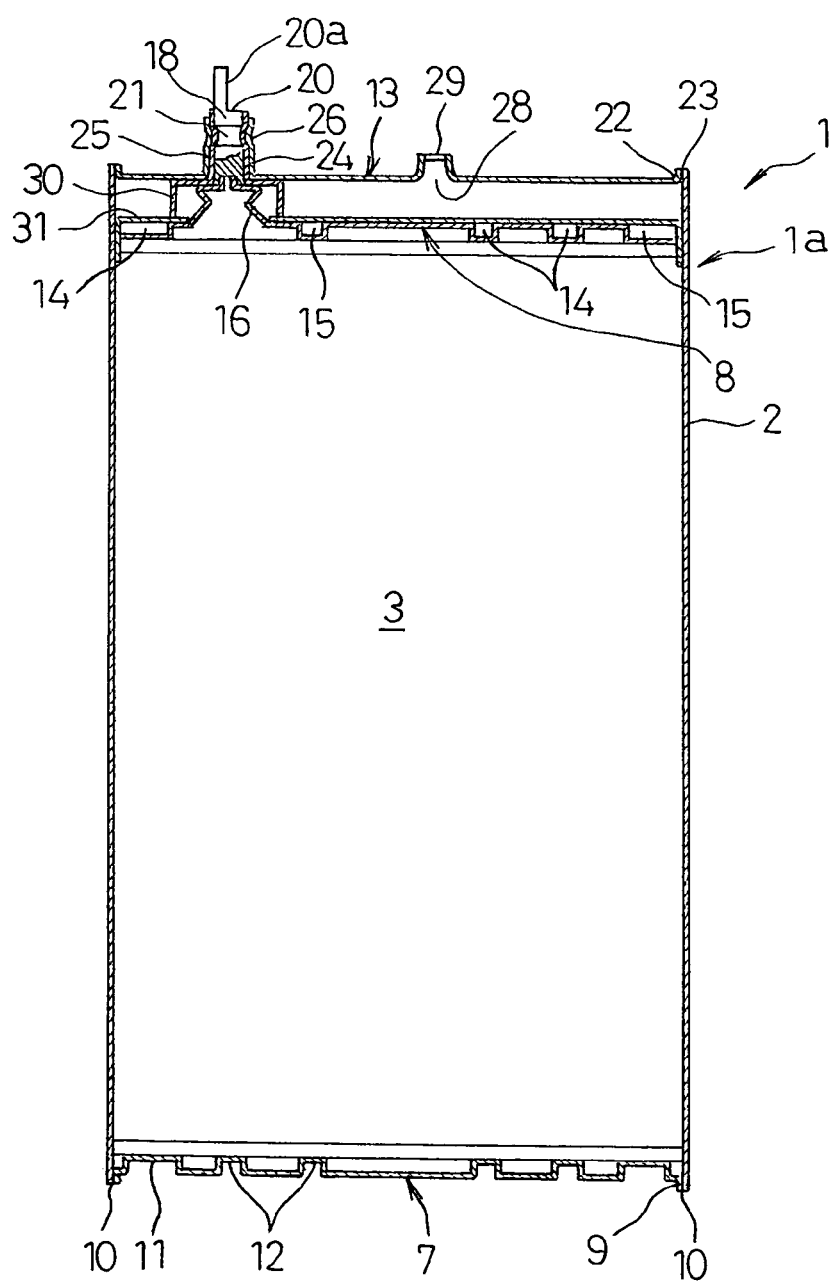
Figure 2:
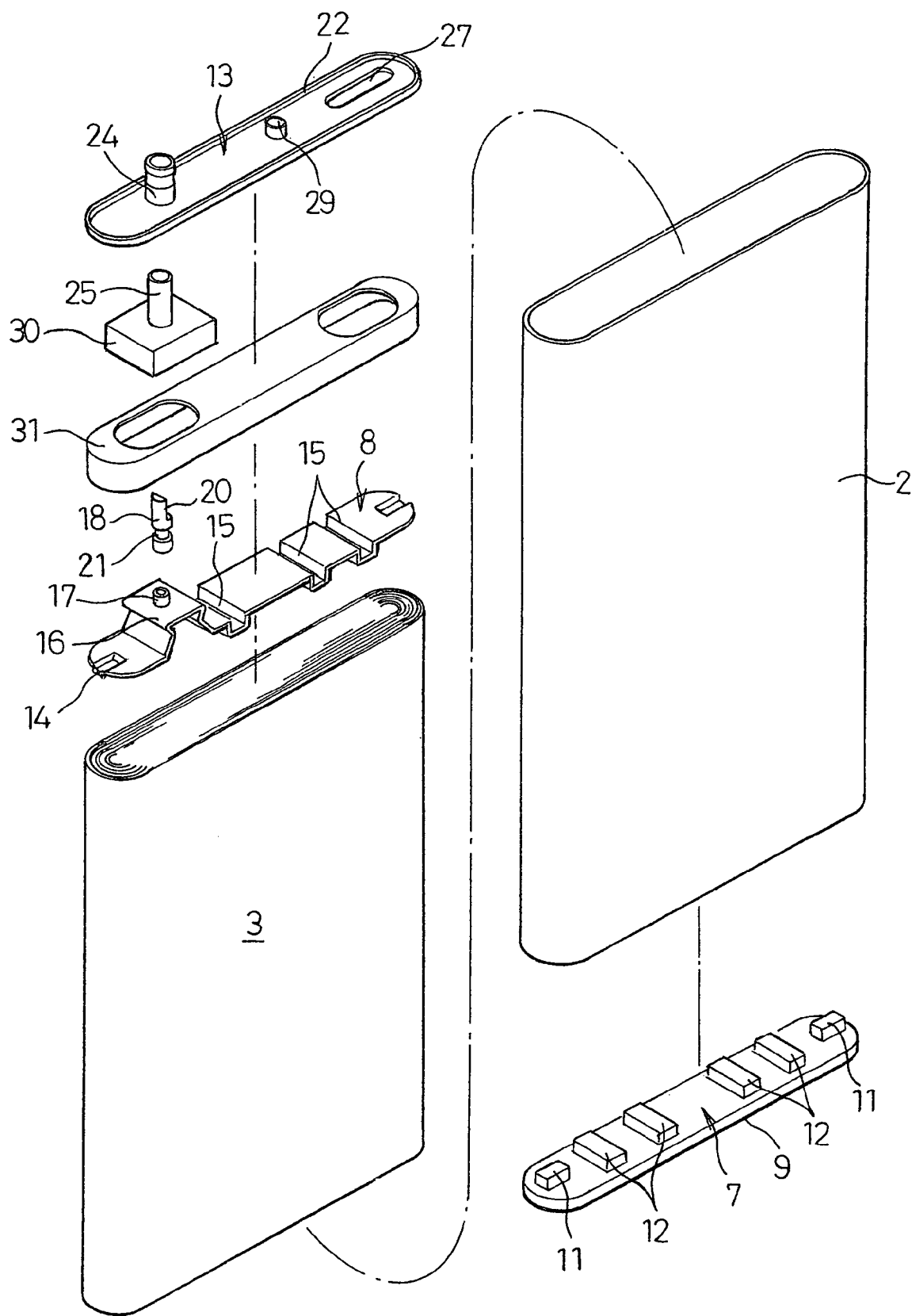
FIG. 2 is an exploded perspective view of the prismatic battery according to the same embodiment.

FIGS. 1A to 2 illustrate a prismatic lithium battery 1 generally consisting of a battery case 1a and elements for electromotive force or an electrode plate group 3 encapsulated in the case 1a with electrolyte. The battery case 1a is made by hermetically welding an upper lid 13 and a lower lid that also functions as a positive collector 7 as will be described later to open ends of a substantially square tube case 2 that has a flat rectangular, round rectangular, or oval cross section.

Figure 12A:
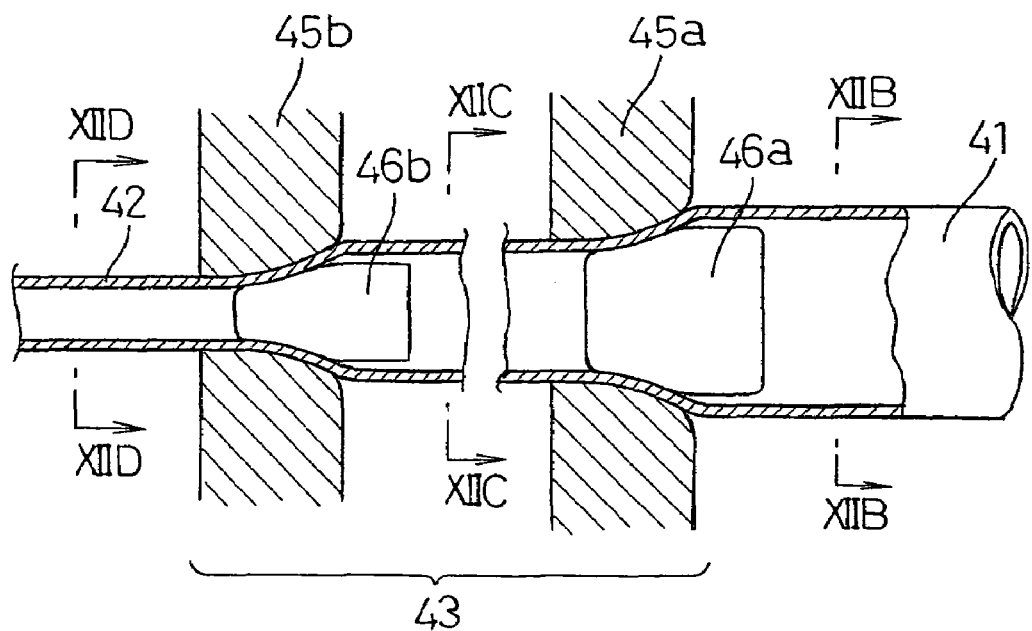
FIG. 12A is a cross-sectional view of a production step of square tube cases of the prismatic battery according to the same embodiment.
Figure 12D:
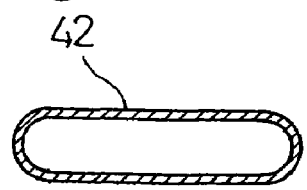
FIGS. 12B to 12D are cross sections taken along the lines XIIB-XIIB, XIIC-XIIC, and XIID-XIID of FIG. 12A, respectively.
Figure 12C:
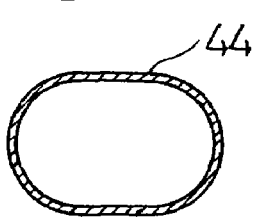
Figure 12B:
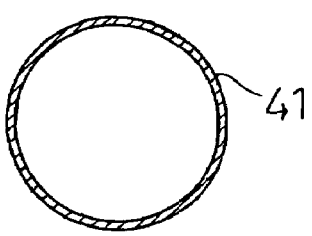

FIGS. 12A to 12D illustrate how the square tube case 2 is made from a cylindrical tube 41 (see FIG. 12B) into an intermediate tube 44 having an oval cross section (see FIG. 12C) and then into a final flat square tube 42 (see FIG. 12D) using a cold drawing machine 43. The square tube 42 is then cut to a predetermined length. The cold drawing machine 43 may preferably be configured such that tube material is drawn through dies 45a and 45b in multiple stages to reduce the cross section into a predetermined shape, using plugs 46a and 46b to control the changing of the inner shape, as shown in FIG. 12A. While FIGS. 12A to 12D illustrate the tube drawn in two stages, it can be drawn into a flat square tube 42 in a single stage.

Figure 3:
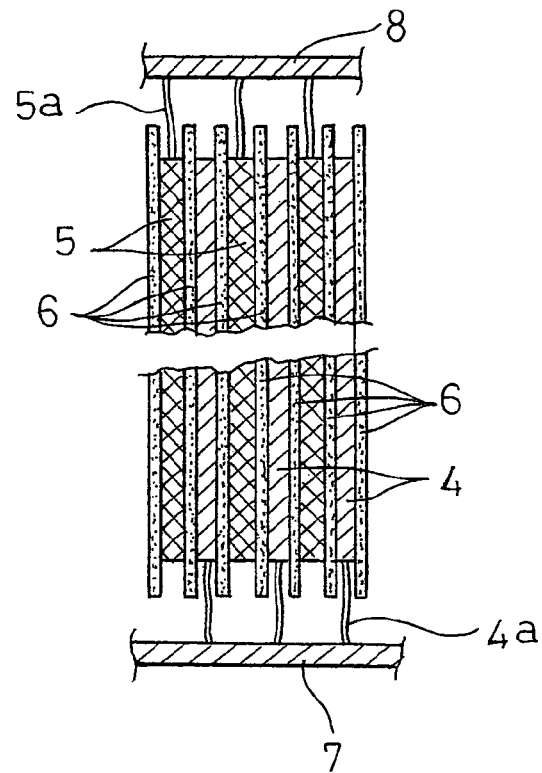
FIG. 3 is a schematic view of the electrode plate group of the prismatic battery according to the same embodiment.

The electrode plate group 3 is made by winding a stack of a positive electrode plate 4, a separator 6, and a negative electrode plate 5 around a thin winding plate and by pressing them flat after removing the winding plate, so that the positive and negative electrode plates 4 and 5 are laminated with respective portions of the separator 6 interposed therebetween as shown in FIG. 3. The positive electrode plate 4 includes an aluminum foil core 4a and positive electrode material paste applied on the core and dried. The negative electrode plate 5 includes a copper foil core 5a and negative electrode material paste applied on the core and dried. The separator 6 is a porous polypropylene film. To prevent short circuits, the electrode plate group 3 will be further covered with an outer separator (not shown), or, an insulating resin layer (not shown) will be formed on the inner side of the case 2, if required.

The aluminum foil core 4a of the positive electrode plate 4 and the copper foil core 5a of the negative electrode plate 5 of the electrode plate group 3 are protruded in opposite directions, and current collectors 7 and 8 are respectively bonded to the protruded cores 4a and 5a by laser beam welding or electron beam welding. For the welding of the negative collector 8 made of copper to the core 5a, ultrasonic welding may be employed instead of laser beam welding, because copper has a high reflectivity to laser light.

Figure 6A:
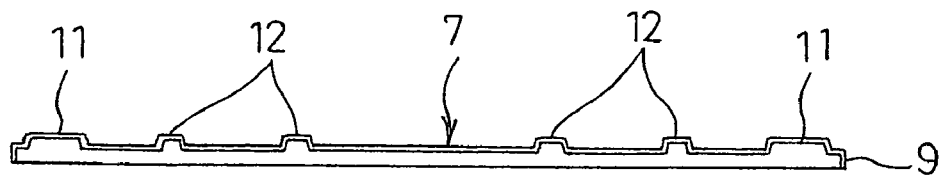
FIG. 6A is a longitudinal cross-sectional view and FIG. 6B is a plan view of the positive collector of the prismatic battery according to the same embodiment.
Figure 6B:
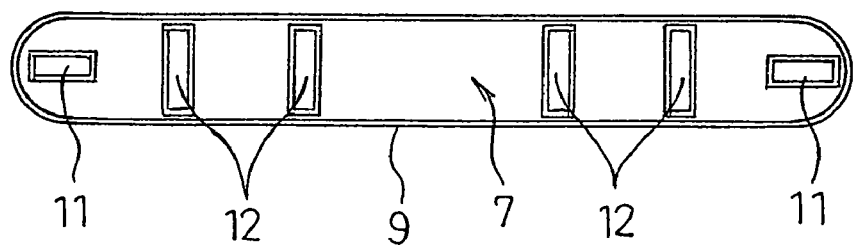

The positive collector 7 functions as a lower lid for closing the lower open end of the case 2, as shown in FIGS. 1A and 1B. The current collector 7 is oval in top plan view conforming to the inner periphery of the lower end of the case 2 and includes a peripheral skirt 9 extending from the entire outer circumference of the collector toward the outside (opposite from the electrode plate group 3), as shown in FIGS. 6A and 6B. The current collector 7 is fitted to the lower end of the case 2, and the lower end edge of the case 2 and the edge of the peripheral skirt 9 are fused together by laser beam welding or the like, thereby the case 2 is sealed at the weld joint 10. Radial bosses 11 protrude to the inner side (electrode plate group 3 side) at the circumferential center of the semi-circles at both ends, and lateral bosses 12, which extend substantially to the entire width, protrude at certain intervals along the length between both ends. These bosses 11 and 12 are tightly pressed against the protruding positive electrode core 4a and bonded thereto by laser beam welding or electron beam welding.

Figure 7A:
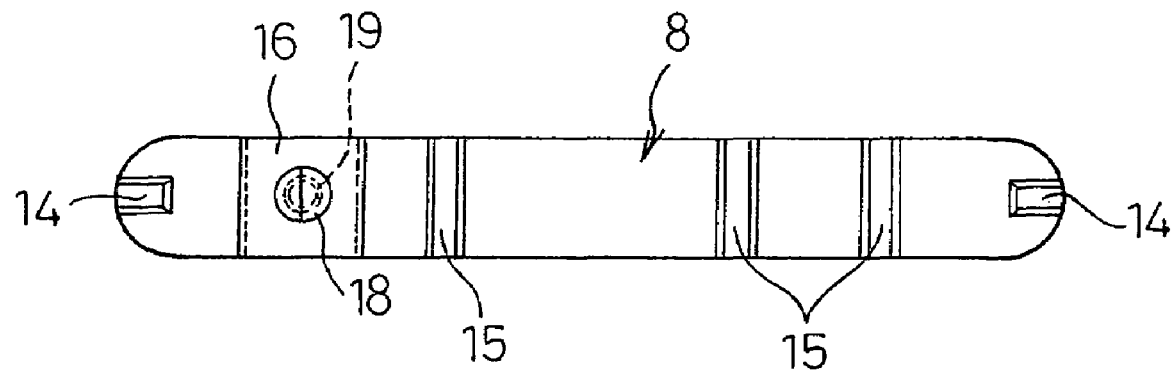
FIG. 7A is a plan view and FIG. 7B is a front view with a fragmentary cross section of the negative collector and the electrode pole of the prismatic battery according to the same embodiment.
Figure 7B:
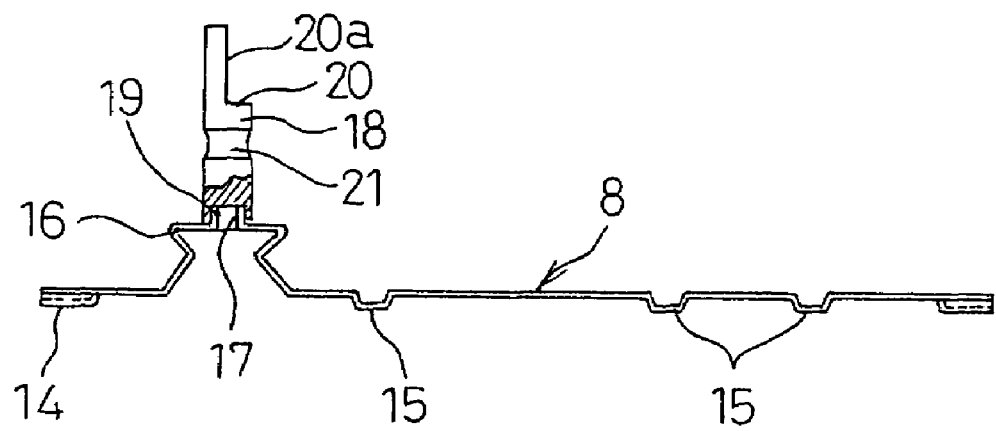

The negative collector 8 is placed between the upper end of the electrode plate group 3 and the upper lid 13 for closing the upper open end of the case 2, as shown in FIGS. 1A and 1B. As shown in FIGS. 7A and 7B, the current collector 8 is a flat plate, which is oval in top plan view so that it fits in the case 2. Radial bosses 14 protrude to the inner side (electrode plate group 3 side) at the circumferential center of the semi-circles at both ends, and lateral bosses 15 protrude at certain intervals along the length between both ends, extending substantially to the entire width. These bosses 14 and 15 are tightly pressed against the protruding negative electrode core 5a and bonded thereto by laser beam welding or electron beam welding.

When welding the bosses 14 and 15 of the current collector 8 which is made of a copper plate to the copper foil core 5a by laser beam welding, the collector 8 should preferably be plated with nickel beforehand, in consideration of the high reflectivity of copper to laser light (i.e., low absorption of laser beam). Nickel plating on the surface of the copper current collector 8 increases laser absorbability and ensures efficient and stable welding. Alternatively, the current collector 8 may undergo oxidation to form copper oxide (II) film on the surface to increase laser absorbability and ensure efficient and stable welding.

Figure 4:
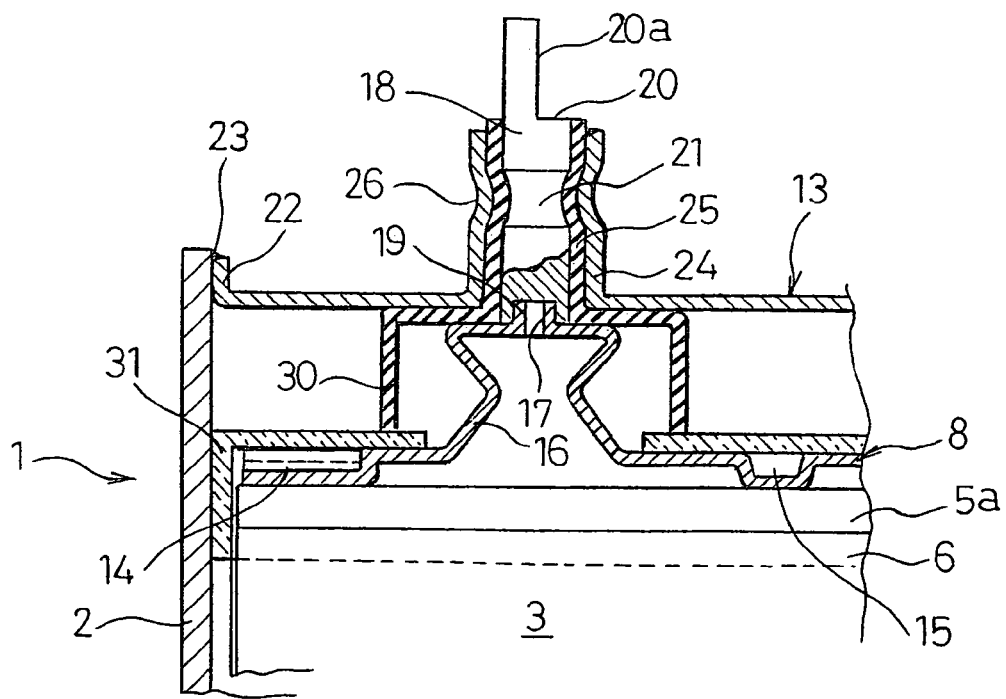
FIG. 4 is a detailed cross-sectional view of the part, at which the electrode pole is located, of the prismatic battery according to the same embodiment.

The negative collector 8 includes a buffer 16 near one end which is formed by bending part of the flat plate in a zigzag manner so that the buffer has a flat top and a Q-shaped or pantograph-shaped cross section. The buffer 16 may be formed separately and bonded to the flat collector 8 afterwards. In the center on the top of the buffer 16 is a cylindrical boss 17 formed by a burring process, as shown in FIGS. 4, 7A, and 7B. This cylindrical boss 17 is fitted to a hole 19 formed in the lower face of an electrode pole 18, which is the negative electrode terminal, so that the pole 18 is precisely fixed in position when bonded to the buffer 16 by resistance welding or the like. The buffer 16 thus connects the electrode pole 18 to the negative collector 8 in a manner that allows movement in both horizontal and vertical directions.

The upper part of the electrode pole 18 is half cut off so that the pole has a D-shape cross section and its vertical face forms a connection surface 20a. A certain distance below the half-cut part 20 is a shallow rounded annular groove 21 that is used for the sealing purpose. The annular groove 21 may not be necessary depending on cases. Several very shallow annular grooves may instead be formed over a predetermined area.

The upper lid 13 is oval in top plan view conforming to the inner periphery of the upper end of the case 2 and includes a peripheral skirt 22 extending from the entire outer circumference toward the outside (opposite from the electrode plate group 3). The upper lid 13 is fitted to the upper end of the case 2, and the upper end edge of the case 2 and the edge of the peripheral skirt 22 are fused together by laser beam welding or the like, thereby the case 2 is sealed at the weld joint 23.

The upper lid 13 includes an integrally formed, upright support cylinder 24. The electrode pole 18 passes through the support cylinder 24, with an insulating gasket 25 provided between the inner periphery of the cylinder 24 and outer periphery of the pole 18. Part of the support cylinder 24 is reduced in diameter at a position corresponding to the annular groove 21 to form an annular crimped portion 26 that has an arc-shaped longitudinal cross section. The gasket 25 inside is compressed by the crimping of the cylinder 24, thereby providing a seal between the electrode pole 18 and the support cylinder 24.

Figure 5:
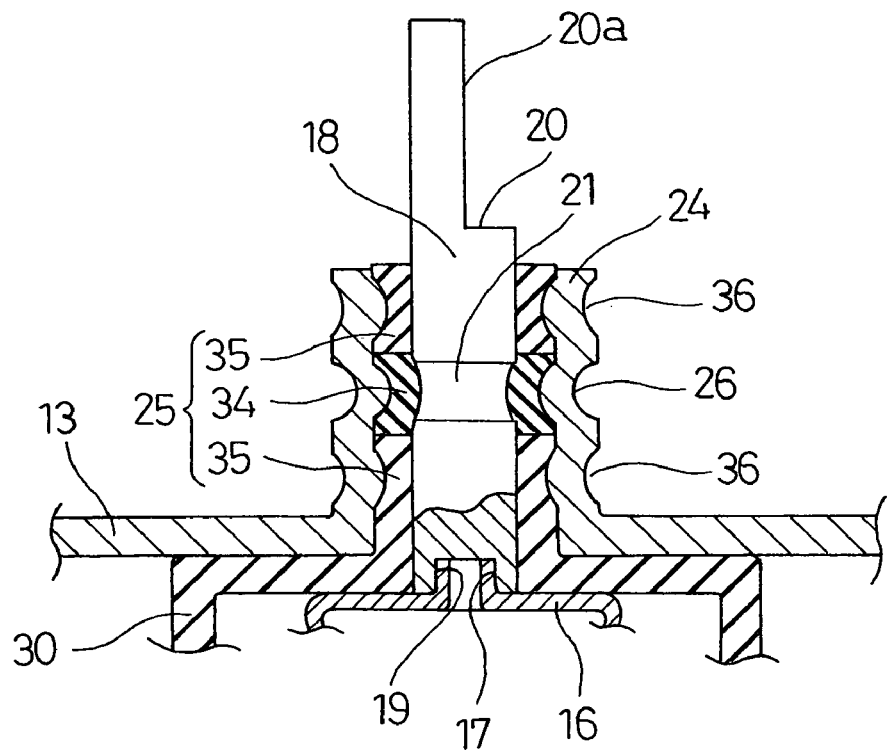
FIG. 5 is a detailed cross-sectional view of another exemplary structure of the part, at which the electrode pole is located, of the prismatic battery according to the same embodiment.

While the insulating gasket 25 shown in FIG. 4 is a single piece, it may consist of two types of gasket as shown in FIG. 5. A first gasket member 34, which is made of a relatively soft material, is placed inside the annular crimped portion 26 of the support cylinder 24, and a second gasket member 35, which is relatively harder than the first gasket member 34, is placed at both axial ends of the first gasket member 34. In this case, additional annular crimped portions 36 should preferably be formed at both axial ends of the crimped portion 26 for compressing the second gaskets 35.

The first and second gasket members 34, 35 may be separately prepared, or made integral with each other. Examples of material combinations for the first and second gasket members 34, 35 include polypropylene (PP) and polyphenylene sulfide (PPS), tetrafluoroethylene-perfluoroalkyl vinyl ether copolymer and PP or PPS, and the like.

Continuing with FIG. 2, the upper lid 13 further includes a safety vent 27 which breaks and releases gas when the inner pressure of the case 2 exceeds a certain limit, a hole 28 (see FIG. 1B) for injecting electrolyte, and a plug 29 for closing the hole 28.

A buffer cover 30 is formed continuously with the insulating gasket 25 for covering the buffer 16 to prevent a short circuit between the buffer 16 and the case 2. The gasket 25 and the buffer cover 30 may be provided separately. An insulating frame 31 is provided to cover at least the outer periphery of exposed part of the negative collector 8 and the negative electrode core 5a, so that a short circuit between the current collector 8 or core 5a and the case 2 is prevented.

Figure 8A:
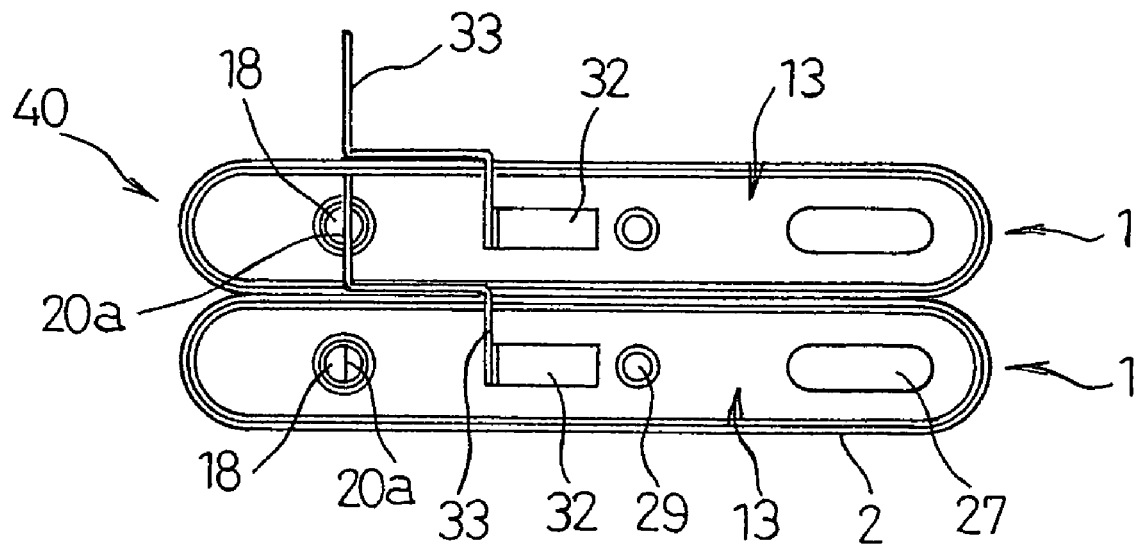
FIG. 8A is a plan view and FIG. 8B is a longitudinal cross-sectional front view of the prismatic battery according to the same embodiment, connected in series.
Figure 8B:
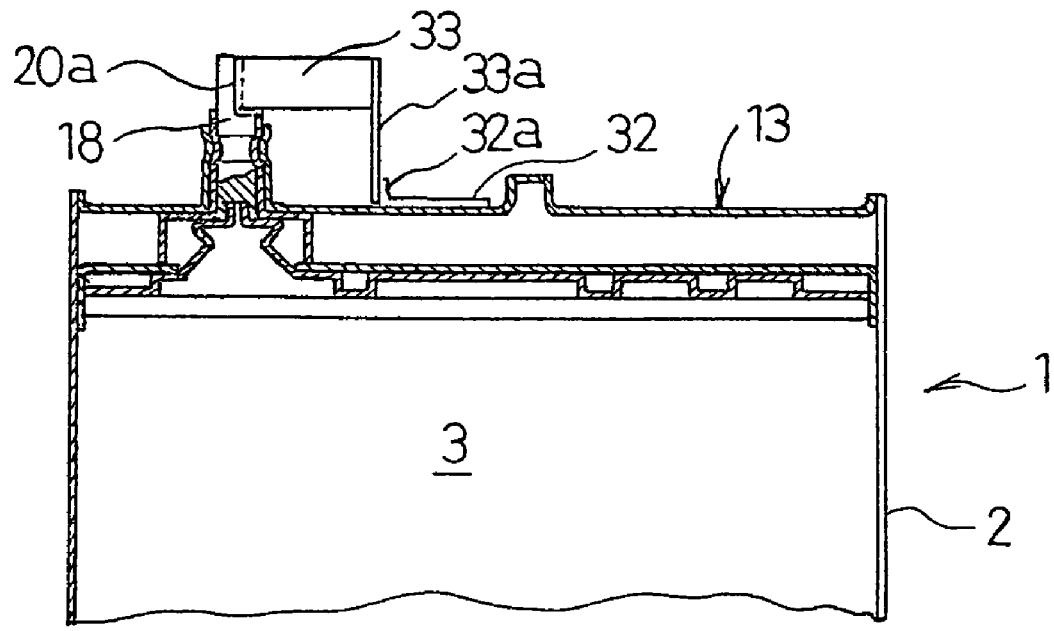

FIGS. 8A and 8B show how to connect two or more prismatic batteries 1 of the invention in series to construct a battery pack 40. The batteries are arranged in parallel and connected via a first connection plate 32 and a second connection plate 33. The first connection plate 32 has an L-shaped cross section, its one end standing upright to form a tab 32a, and is welded to the upper lid 13, which is connected to the positive collector 7 via the case 2 and functions as the positive electrode terminal. The second connection plate 33 has a cranked shape in top plan view and its downwardly depending tab 33a at one end is welded to the tab 32a of the first connection plate. The other end of the second connection plate 33 is welded to the connection surface 20a of the electrode pole 18, which is the negative electrode terminal, of the adjacent prismatic battery 1. The first and second connection plates 32, 33 may be formed in one piece with each other.

The batteries 1 arranged side by side are thus connected in series in a compact manner and with less connection resistance. The electrode pole 18 has the connection surface 20a which is wide enough because of the half-cut part 20 for reliable and efficient electrical connection with less connection resistance.

Figure 9A:
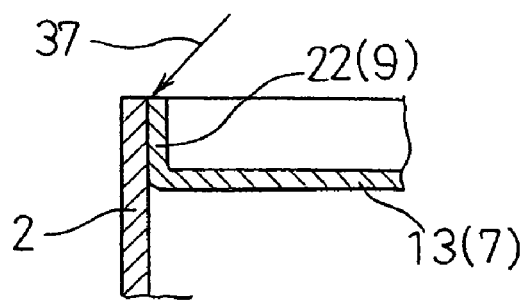
FIGS. 9A to 9C are cross-sectional views of related parts, illustrating the processes of welding the case and the lid of the prismatic battery according to the same embodiment.

The upper lid 13 has the peripheral skirt 22 that protrudes from the outer periphery to the outside of the case. The lid 13 is fitted to the open end of the case 2, and a laser beam 37 is projected diagonally from the inner side of the peripheral skirt 22 toward the edge of the peripheral skirt at a position nearer to the edge of the case 2, as shown in FIG. 9A. This fuses the edge of the peripheral skirt 22 with the inner peripheral side of the open end edge of the case 2 as shown in FIG. 9B, forming the weld joint 23 that joins the upper lid 13 to the case 2 hermetically.

Figure 9B:
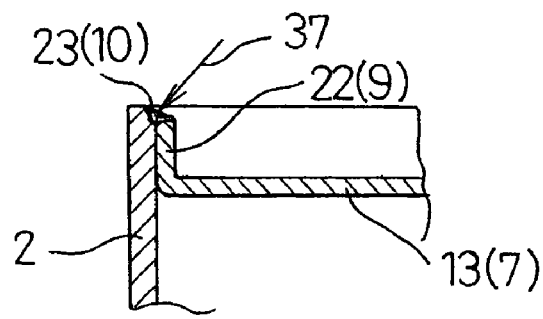
Figure 9C:
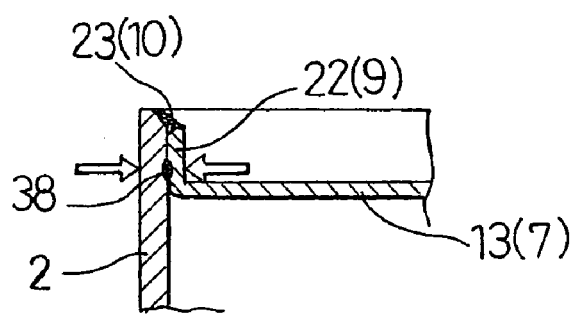

The above welding process may be followed by resistance spot welding, if necessary, to form additional weld joints 38 for reinforcement, as shown in FIG. 9C, at circumferentially spaced positions below the edges of the case 2 and peripheral skirt 22, attaching the welding electrodes to the outer surface of the case 2 and the inner surface of the peripheral skirt 22 as indicated by white arrows. Such additional weld joints 38 may also be formed by laser point welding, ultrasonic welding, or intermittent seam welding.

The parenthesized reference numerals 7, 9, and 10 in FIGS. 9A to 9C represent the lower lid or positive collector and its peripheral skirt and weld joint, as the current collector 7 is likewise welded to the open end edge of the case 2.

Figure 10A:
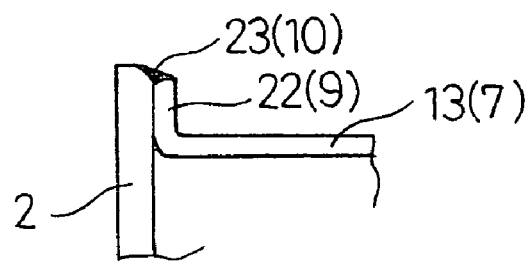
FIGS. 10A and 10B are schematic cross-sectional views of related parts of the battery case of the prismatic battery according to the same embodiment, FIG. 10A illustrating a state before pressure buildup inside the case, and FIG. 10B illustrating a state at the time of the pressure buildup.
Figure 10B:
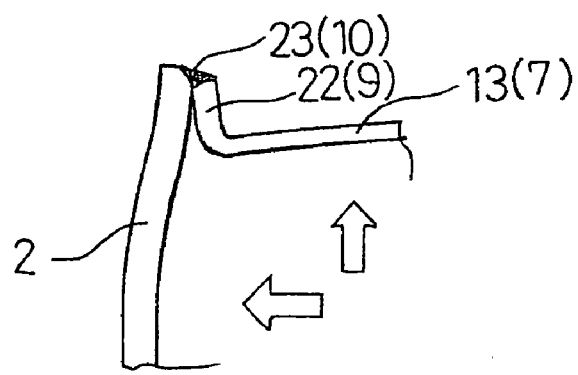

Because of the hollow structure of the lids 13 and 7 with the peripheral skirts 22 and 9 standing from the outer periphery, the weight of the lids, and of the battery, is reduced. Furthermore, the sealing structure of the invention withstands higher pressure in the event of pressure buildup inside the case 2 followed by swelling of the case, as the weld joints 23 and 10 between the open end edge of the case 2 and the edge of the peripheral skirts 22 and 9 function as a fulcrum, thereby mitigating the force applied to the joints 23 and 10, as shown in FIGS. 10A and 10B.

Since laser beam 37 is projected from the inner side of the peripheral skirt 22 or 9 toward the edge of the peripheral skirt, it is possible, without having to use a small-diameter laser beam, to fuse together the edge of the peripheral skirt 22 or 9 and the open end edge of the case 2 such that the edge surface of the case 2 is not entirely fused. Thus the weld joint 23 or 10, which exhibits high strength and good sealing properties, is formed efficiently, with the edge surface of the case 2 being maintained flat, as shown in FIG. 9B.

Additional weld joints 38, which are formed below the edges of the case 2 end and the peripheral skirt 22 or 9 for reinforcement, will further enhance the joint strength between the case 2 and the lid 13 or 7.

Figure 11A:
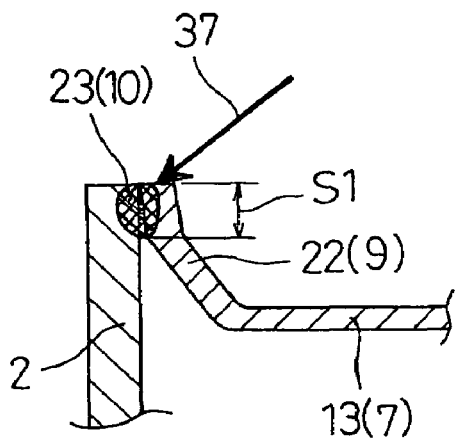
FIGS. 11A and 11B are views for explaining the difference in the welding process and its effect between the same embodiment of the invention and a comparative example.
Figure 11B:
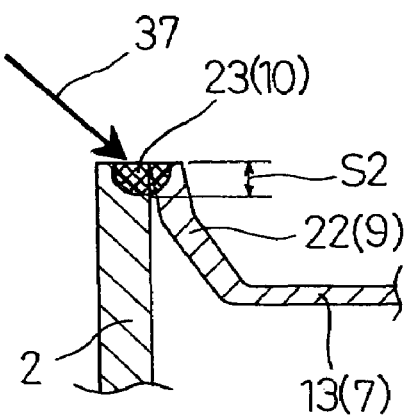

In this embodiment, wall thickness of the lid 13 or 7 is thinner than wall thickness of the case 2 as shown in FIG. 11A, and as mentioned above, the laser beam 37 is projected toward the peripheral skirt 22 or 9 to weld the lid 13 or 7 to the case 2. This way, the fusing area S1 between the case 2 and the lid 13 or 7 is made large, increasing the weld strength. If the laser beam 37 is projected from the case 2 side as shown in FIG. 11B, the fusing area S2 becomes smaller, and while the sealing may be achieved, the joint strength will not be high enough. Higher joint strength using the same laser energy means cost reduction, as additional parts or welding process for reinforcement are made unnecessary. The lids 13 and 7 are made of a thin plate material and are pressed into a complex shape. Even though it is thin, the lid has a sufficient strength to withstand pressure because of the above discussed structure wherein the peripheral skirt stands from the outer periphery of the lid, and enables battery weight reduction.

Figure 13:
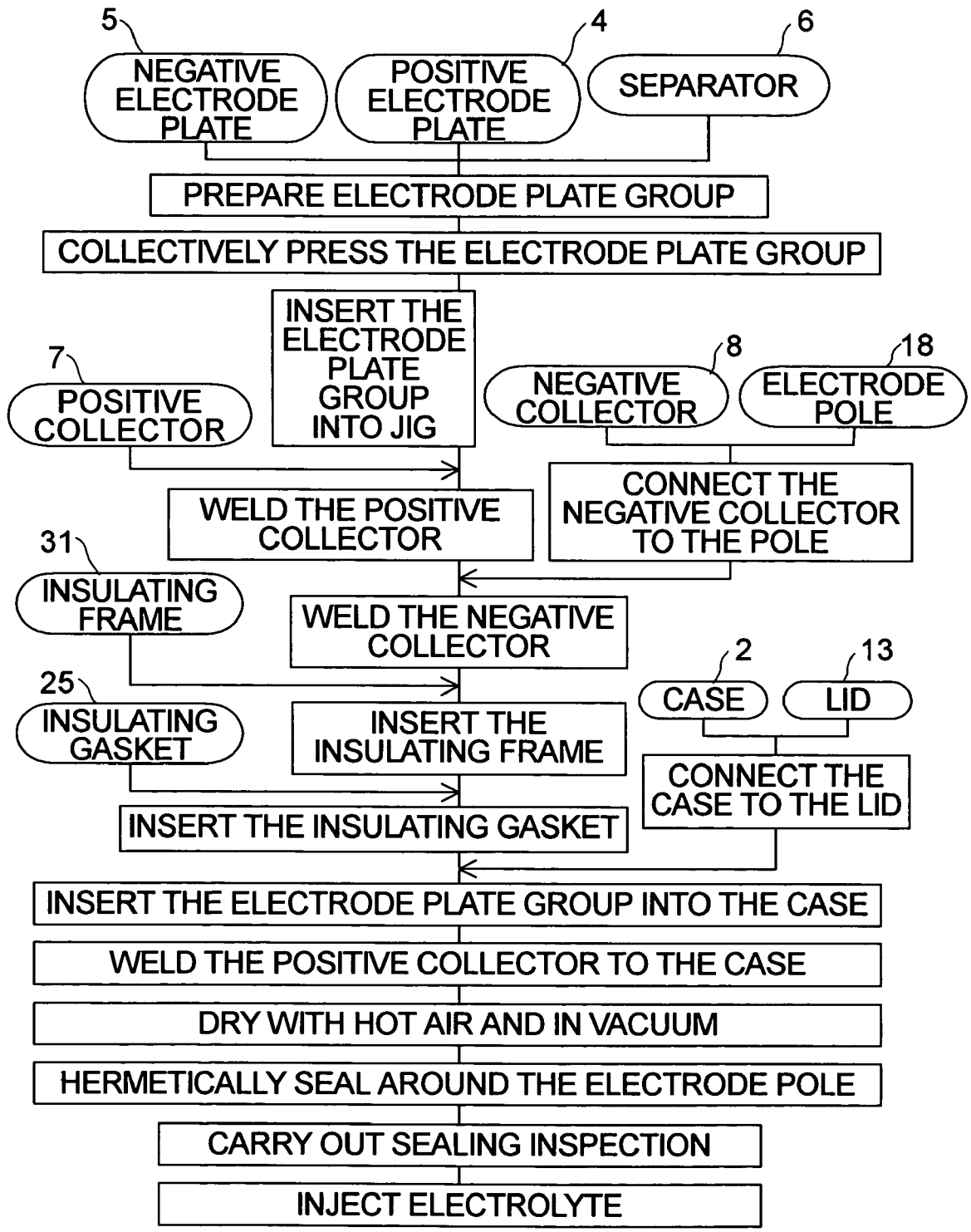
FIG. 13 is a production step of the prismatic battery according to the same embodiment.
Figure 14:
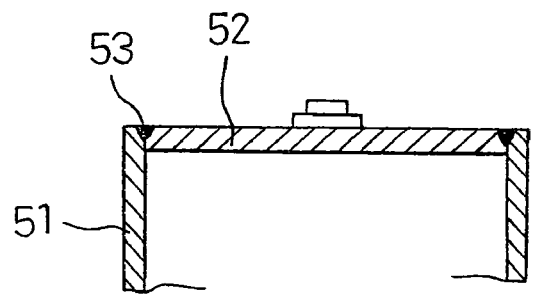
FIG. 14 is a cross-sectional view of related part of the case of a conventional sealed battery.
Figure 15:
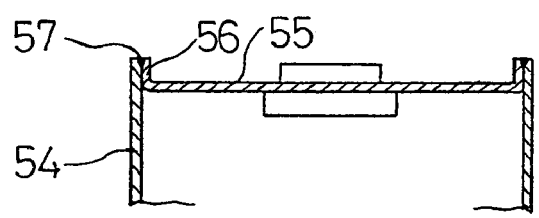
FIG. 15 is a cross-sectional view of related part of the case of another conventional sealed battery.
Figures 16A, 16B, 16C:
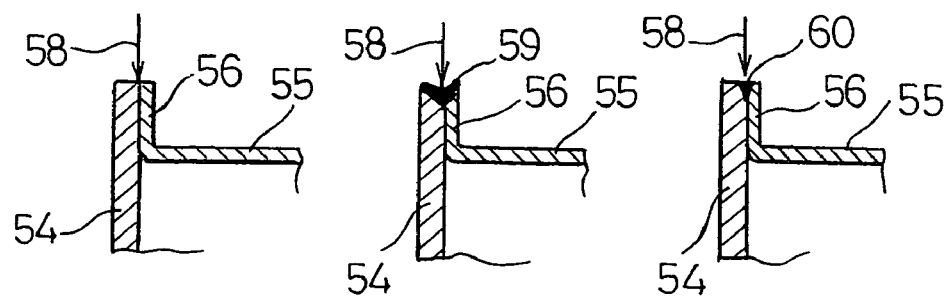
FIGS. 16A to 16C are cross-sectional views of related part of the case of yet another conventional sealed battery, given for explaining the process of welding a lid to the case and its problem.

The prismatic battery 1 of the invention is manufactured in the following procedure as shown in FIG. 13. First, the electrode plate group 3 comprising the positive electrode 4, the negative electrode 5, and the separator 6, is collectively pressed to a predetermined shape as described above, and inserted into a jig to be held in position. The positive collector 7 is welded to one end of the electrode plate group 3 by laser beam welding or electron beam welding. The electrode pole 18 is welded to the negative collector 8 by resistance welding, and the current collector 8 is welded to the other end of the electrode plate group 3 by laser beam welding or electron beam welding.

The insulating frame 31 is inserted such that the outer periphery of the negative collector 8 and core 5a protruding from one end of the electrode plate group 3 is covered. The insulating gasket 25, which is in one piece with the buffer cover 30, is inserted to cover the buffer 16, and the gasket 25 is fitted around the electrode pole 18. The upper lid 13 is fitted to the open end of the case 2 and welded at the weld joint 23, after which the electrode plate group 3 with the current collectors 7 and 8 are inserted into the case 2, and the positive collector 7 is welded to the case 2 by laser beam welding or electron beam welding at the weld joint 10.

The electrode plate group 3 inside the case 2 are then dried with hot air and in vacuum, and part of the support cylinder 24 is crimped at a position corresponding to the annular groove 21 to form the annular crimped portion 26, thereby providing a seal around the electrode pole 18. After carrying out sealing inspection, the case is filled with electrolyte, and sealed with the plug 29, to complete the prismatic battery 1.

According to the present embodiment of the invention, the negative collector 8 is connected to one end of the electrode plate group 3 accommodated in the case 2, and the electrode pole 18, which is connected to the negative collector 8 and functions as one electrode terminal, is fitted into the support cylinder 24 that is provided on the upper lid 13, which is fixedly attached to the case 2. The insulating gasket 25 is interposed between the cylinder 24 and the pole 18, and compressed by forming the annular crimped portion 26, to provide a seal. High sealing property is thus achieved easily and stably by forming the annular crimped portion 26 in the support cylinder 24, and because the annular crimped portion 26 has an arc-shaped longitudinal cross section, there is no risk of generating a crack in the gasket 25 because of locally concentrated, excessive load when crimping the cylinder 26.

The buffer 16, via which the electrode pole 18 is mounted on the current collector 8, enables the pole 18 to move and smoothly absorb displacement of the pole relative to the support cylinder 24 due to dimensional tolerances of the case 2 or the upper lid 13. Therefore, there is no risk that the insulating gasket 25 between the electrode pole 18 and the support cylinder 24 is unevenly compressed, and sealing is achieved highly reliably.

Even if an external impact is applied to the electrode pole 18, the pole freely sways around the sealed part to absorb such force, so that the sealing property is not significantly affected and stably maintained.

The electrode pole 18 and the support cylinder 24 are substantially concentric with each other. Therefore, the electrode pole 18 need only be formed with the shallow rounded annular groove 21 so that the insulating gasket 25 is compressed by the process of forming the annular crimped portion 26 in the support cylinder 24 at a position corresponding to the annular groove 21 to achieve reliable sealing. Further, the gasket 25 is prevented from being come off, by the annular groove 21. The sealing property, in fact, is sufficiently high even without the annular groove 21 because of the concentricity between the pole 18 and the cylinder 24. Without the annular groove 21, also, there will be no restriction on the position of the annular crimped portion 26, leading to higher work efficiency. Instead of the annular groove 21, the electrode pole 18 will be formed with a large number of very shallow annular grooves over a suitable area so as to achieve both high sealing property and good work efficiency.

The structure shown in FIG. 5 further improves sealing reliability, wherein the first gasket member 34 which is relatively soft is held from both sides with second gasket member 35 which is relatively hard when compressing the gasket by forming the annular crimped portion 26 in the support cylinder 24 to compress the gaskets. The above effect is ensured if the second gasket member 35 is secured by forming an additional annular crimped portion 36 in the support cylinder 24.

The buffer cover 30, which is formed in one piece with the insulating gasket 25, reliably prevents contact and short circuit faults between the buffer 16 and the case 2. By forming the buffer cover 30 integrally with the gasket 25, the number and cost of parts and assembling steps are reduced.

The insulating frame 31, which covers at least the outer periphery of the negative collector 8 and exposed part of the negative electrode core 5a, reliably prevents contact and short circuit faults between the core 5a and the case 2.

The peripheral skirts 22 and 9 standing from the outer periphery of the thin-plate upper lid 13 and lower lid (positive collector) 7 offer good surface rigidity and enable weight reduction of the battery. In the event of the swelling of the case 2 because of pressure buildup, the weld joints 23 and 10 between the open end edge of the case 2 and the edge of the peripheral skirts 22 and 9 function as a fulcrum and mitigate the force applied to the joints to improve the strength against the inner pressure.

The weld joints 23 and 10 are formed by projecting a laser beam 34 from the inner side of the peripheral skirts 22 and 9 toward the edge of the peripheral skirt so that the edge surface of the case 2 is maintained relatively flat. This way, the joints 23 and 10 are formed efficiently, while ensuring sufficient joint strength and high sealing property, as described above. Additional reinforcing weld joints 35 below the edges of the case and the peripheral skirt further increase the joint strength between the case 2 and the lid 13 (7).

Both current collectors 7 and 8 are formed with bosses 11, 12, 14, and 15 to be tightly pressed against the positive and negative electrode cores 4a and 5a, respectively. Thus, they are welded together at the pressed positions reliably so that electrical connection is ensured with low connection resistance. The radial bosses 11 and 14 in the semi-circular parts at both ends, in particular, are welded to both ends of the oval-shaped end face of the electrode plate group 3 where the cores are densely packed, to achieve high current collecting efficiency.

As the positive collector 7 functions as the lower lid of the case 2, the battery structure is simplified and the number of parts and assembling steps is reduced, which leads to cost reduction. As the number of connecting points is also reduced, the connection resistance is made lower. The transverse bosses 12 provided at certain intervals of the current collector 7 increases the surface rigidity of the collector 7, or the lower lid, together with the peripheral skirt 9 and enables the current collector 7 to be made of thin plate, so that swelling of the lower lid caused by pressure buildup inside the case 2 is effectively suppressed, and cost and weight are reduced.

The battery case 1a, which is flat and deep, is readily and efficiently produced by a cold drawing process in which a cylindrical tube 41 is drawn into the square tube case 2, to both open ends of which the upper lid 13 and the lower lid 7 are hermetically welded. As the cold drawing process offers increased rigidity of the case 1a, it withstands higher pressure. The battery case 1a may have any length, since the length of the case 2 is readily changed, and so various different capacity batteries will be produced at low cost with good productivity only by changing the length of the electrode plate group 3 corresponding to the length of the case 2, other elements all being used in common. Thus, flat prismatic batteries of various capacities having high cooling properties are produced at low cost with good productivity.

The prismatic battery 1 of the invention is produced with good productivity despite its conventional structure wherein the prismatic case 2 with open ends is used and the battery case 1a and the electrode pole 18 at one end function as electrode terminals of opposite polarities. The battery is made through the processes of: welding a positive collector 7 that functions also as the lower lid to one end of an electrode plate group and welding a negative collector 8 mounted with the electrode pole 18 to the other end of the electrode plate group; hermetically welding an upper lid 13 to one open end of the prismatic case 2, the upper lid 13 having a support cylinder 24 to be fitted upon the electrode pole 18; mounting an insulating gasket 25 on the electrode pole 18; inserting the electrode plate group 3 into the case 2 from the opposite end of the upper lid 13; compressing the support cylinder 24 to reduce its diameter; and hermetically welding the lower lid 7 that is connected to the electrode plate group 3 to the other open end of the case 2.

While the upper lid 13 includes the safety vent 27 in the embodiment described above, the insulating gasket 25 between the electrode pole 18 and the support cylinder 24 also functions as a safety vent, by designing the gasket 25 to deform when the pressure inside the case exceeds a certain level (i.e. 0.5 to 1.0 MPa) to communicate inside and outside of the case 2. The safety vent 27 will then be dispensed with to achieve a further cost reduction.

While the electrode pole 18 is fitted in the support cylinder 24 formed on the upper lid 13 with the insulating gasket 25 interposed therebetween in the embodiment described above, the buffer 16 is effective in a different structure, wherein, for example, the pole 18 is fixedly attached to the upper lid 13 and the insulating gasket is interposed between the outer periphery of the upper lid 13 and the inner periphery of the upper end of the case 2. That is, by connecting the electrode pole 18 or the upper lid 13 to the current collector at one end of the electrode plate group 3 via the buffer 16, the buffer absorbs displacement of the pole 18 relative to the current collector.

As described above, the prismatic battery of the invention has the insulating gasket interposed between the outer periphery of the electrode pole and the inner periphery of the support cylinder that is provided on the lid for closing one open end of the case, the support cylinder being formed with at least one annular crimped portion having an arc-shaped longitudinal cross section, which provides a highly reliable seal without the risk of generating a crack in the gasket. The open end edge of the case and the edge of the peripheral skirt of the lid are fused together such that the end surface of the case is maintained relatively flat and the weld joint is formed with good joint strength and high sealing reliability and efficiency. Flat prismatic batteries of any desired length are readily and efficiently produced, because the battery case is simply made of a square tube case with lids to close its open ends, and various different capacity prismatic batteries are produced at low cost since, apart from the case and the electrode plate group, the battery elements are used in common. The prismatic battery of the invention is particularly applicable to lithium ion batteries, nickel metal hydride batteries, and other prismatic batteries.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A prismatic battery comprising:
a square tube case having at least one open end for accommodating an electrode plate group;
a current collector of one polarity welded to one end of the electrode plate group;
an electrode pole that functions as an electrode terminal connected to said current collector;
a buffer that connects said current collector and said electrode pole and allows movement of said electrode pole in a horizontal direction and a vertical direction;

a lid for closing said one open end of the case, the lid being formed with a support cylinder that is fitted onto the electrode pole; and an insulating gasket interposed between an inner periphery of the support cylinder and an outer periphery of the electrode pole, wherein the support cylinder is formed with at least one annular crimped portion that has an arc-shaped longitudinal cross section.

2. The prismatic battery according to claim 1, wherein the insulating gasket comprises a first gasket member and a second gasket member, the first gasket member being positioned at an area where the annular crimped portion is formed in the support cylinder, and the second gasket member being on both axial sides of the first gasket member, the second gasket member being harder than the first gasket member.

3. The prismatic battery according to claim 2, wherein secondary annular crimped portions are formed in the support cylinder at both axial ends of the area where said one annular crimped portion is formed.

4. The prismatic battery according to claim 1, wherein the buffer has a cylindrical boss protruding from a top surface, the cylindrical boss being fitted into a hole formed in a lower end of the electrode pole.

5. The prismatic battery according to claim 1, wherein the insulating gasket includes an integrally formed buffer cover for preventing contact between the buffer and the case.

6. The prismatic battery according to claim 5, further including an insulating frame for covering at least an outer peripheral part of said current collector and an exposed part of an electrode core material at the one end of the electrode plate group.

7. The prismatic battery according to claim 6, wherein the buffer cover is formed in one piece with the insulating frame.

8. The prismatic battery according to claim 1, wherein the lid has a shape that conforms to an inner periphery of the open end of the case, and includes a skirt protruding outwards from the outer peripheral edge of the lid, the lid being hermetically welded to the open end of the case by projecting laser beam from an inner side of the skirt of the lid toward the edge of the skirt to form a weld joint between the open end edge of the case and the edge of the skirt.

9. The prismatic battery according to claim 8, wherein wall thickness of the lid is thinner than wall thickness of the case.

10. The prismatic battery according to claim 8, wherein an additional reinforcing weld joint is formed by spot welding or seam welding at a position below the edges of the case and the skirt.

11. The prismatic battery according to claim 8, wherein the lid includes a plurality of bosses spaced along the length and extended over the width of the lid, the bosses protruding toward the inside of the case and being welded directly or indirectly to the electrode plate group.

12. The prismatic battery according to claim 1, wherein the square tube case is made from a cylindrical tube having open ends that are hermetically closed with the lid for closing said one open end of the square tube case and a second lid to form a battery case.

13. The prismatic battery according to claim 12, wherein the square tube case is made from the cylindrical tube by a cold drawing process.

14. The prismatic battery according to claim 12, wherein the second lid functions as a current collector and is welded to a second end of the electrode plate group, is further fitted to and hermetically welded to one open end of the square tube case.

15. The prismatic battery according to claim 1, wherein said current collector of one polarity, which is negative, is made of a nickel-plated copper plate.

16. The prismatic battery according to claim 1, wherein said current collector of one polarity, which is negative, is made of a copper plate with an oxide film formed thereon.

17. The prismatic battery according to claim 1, wherein the insulating gasket is designed to deform when pressure inside the case exceeds a predetermined level to communicate inside and outside of the case.

18. The prismatic battery according to claim 1, wherein the electrode pole includes a half-cut portion that forms a connection surface.

* * * * *